US012338979B2

(12) United States Patent
Isaacs et al.

(10) Patent No.: US 12,338,979 B2
(45) Date of Patent: Jun. 24, 2025

(54) UNDER CHASSIS LIGHT

(71) Applicant: MILWAUKEE ELECTRIC TOOL CORPORATION, Brookfield, WI (US)

(72) Inventors: Jason Isaacs, Milwaukee, WI (US); Benjamin D. Gall, Milwaukee, WI (US); Timothy J. Campbell, Brookfield, WI (US); Duane W. Wenzel, Waukesha, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 897 days.

(21) Appl. No.: 17/051,232

(22) PCT Filed: Sep. 11, 2020

(86) PCT No.: PCT/US2020/050328
§ 371 (c)(1),
(2) Date: Oct. 28, 2020

(87) PCT Pub. No.: WO2021/050825
PCT Pub. Date: Mar. 18, 2021

(65) Prior Publication Data

US 2023/0313978 A1 Oct. 5, 2023

Related U.S. Application Data

(60) Provisional application No. 62/939,392, filed on Nov. 22, 2019, provisional application No. 62/901,907,
(Continued)

(51) Int. Cl.
*F21L 4/04* (2006.01)
*F21V 21/096* (2006.01)
(Continued)

(52) U.S. Cl.
CPC ............ *F21V 21/0965* (2013.01); *F21L 4/04* (2013.01); *F21V 21/28* (2013.01); *F21V 21/406* (2013.01);
(Continued)

(58) Field of Classification Search
CPC . H05B 45/10; F21L 4/04; F21V 21/28; F21V 21/26; F21V 21/406; F21Y 2115/10; F21W 2107/10
See application file for complete search history.

(56) References Cited

U.S. PATENT DOCUMENTS 2,885,539 A * 5/1959 McDermott ............ F21L 14/00 362/198
3,917,940 A * 11/1975 Duddy .................... F21S 6/003 362/398
(Continued)

FOREIGN PATENT DOCUMENTS

CA 2484693 A1 * 5/2006 .............. F21L 14/02
CN 2045057 U * 9/1989
(Continued)

OTHER PUBLICATIONS

Extended European Search Report for Application No. 20863561.5 dated Jun. 23, 2023 (9 pages).
(Continued)

*Primary Examiner* — Fatima N Farokhrooz
(74) *Attorney, Agent, or Firm* — Michael Best & Friedrich LLP

(57) ABSTRACT

A light assembly configured to be removably coupled to a ferromagnetic support surface includes a base with a magnetic coupling member, a battery coupled to the base, an arm pivotally coupled to the base, and a light head pivotally coupled to the arm such that a position of the light head relative to the base is adjustable. The light head includes a
(Continued)

light-emitting element powered by the battery. The magnetic coupling member is configured to support the light assembly by magnetic attraction to the support surface.

20 Claims, 5 Drawing Sheets

Related U.S. Application Data filed on Sep. 18, 2019, provisional application No. 62/899,361, filed on Sep. 12, 2019.

(51) Int. Cl.

| | |
|---|---|
| ***F21V 21/28*** | (2006.01) |
| ***F21V 21/40*** | (2006.01) |
| ***H05B 45/10*** | (2020.01) |
| *F21W 107/10* | (2018.01) |
| *F21Y 115/10* | (2016.01) |

(52) U.S. Cl.

CPC ......... *H05B 45/10* (2020.01); *F21W 2107/10* (2018.01); *F21Y 2115/10* (2016.08)

(56) References Cited

U.S. PATENT DOCUMENTS

| | | | | |
|---|---|---|---|---|
| D292,236 | S | 10/1987 | Caldwell | |
| D295,287 | S | 4/1988 | Krogsrud et al. | |
| 5,012,294 | A * | 4/1991 | Sasabe | G03G 15/6502 271/127 |
| 5,012,394 | A | 4/1991 | Woodward | |
| D326,334 | S | 5/1992 | Meyer et al. | |
| D359,225 | S | 6/1995 | Reed | |
| 5,746,495 | A * | 5/1998 | Klamm | F21V 29/67 362/183 |
| 6,260,985 | B1 | 7/2001 | Zeller | |
| D457,671 | S | 5/2002 | Jacquelin | |
| 6,422,724 | B1 | 7/2002 | Monteiro | |
| D475,799 | S | 6/2003 | Kovacik et al. | |
| 6,592,241 | B1 | 7/2003 | Kovacik et al. | |
| D526,433 | S | 8/2006 | Li | |
| D542,447 | S | 5/2007 | Krieger et al. | |
| 7,434,954 | B1 | 10/2008 | Edgar | |
| D619,299 | S | 7/2010 | Zheng | |
| 7,871,179 | B1 | 1/2011 | Edgar | |
| 8,072,345 | B2 | 12/2011 | Gallo | |
| 8,172,436 | B2 | 5/2012 | Coleman et al. | |
| D663,454 | S | 7/2012 | Sham | |
| 8,347,705 | B2 | 1/2013 | Muhs | |
| 8,545,066 | B2 | 10/2013 | Coleman et al. | |
| D723,725 | S | 3/2015 | Asano et al. | |
| D797,353 | S | 9/2017 | Stanley | |
| D800,939 | S | 10/2017 | Cai | |
| D807,404 | S | 1/2018 | Mantes et al. | |
| D816,252 | S | 4/2018 | Harvey et al. | |
| 9,995,432 | B1 | 6/2018 | Girault | |
| 10,001,252 | B2 | 6/2018 | Inskeep | |
| 10,107,484 | B2 | 10/2018 | Moyers | |
| D850,689 | S | 6/2019 | Harvey et al. | |
| 10,386,049 | B2 | 8/2019 | Yu et al. | |
| 10,393,326 | B2 | 8/2019 | Inskeep | |
| 10,443,826 | B2 | 10/2019 | Kestler | |
| D887,054 | S | 6/2020 | Zhang | |
| D892,731 | S | 8/2020 | McSweyn | |
| D893,416 | S | 8/2020 | McSweyn | |
| D899,650 | S | 10/2020 | Harvey et al. | |
| D938,911 | S | 12/2021 | Wild | |
| D945,040 | S | 3/2022 | Schuss | |
| D956,272 | S | 6/2022 | Gall et al. | |
| D970,065 | S | 11/2022 | Waldmann | |
| 2006/0061991 | A1 | 3/2006 | Yeh | |
| 2006/0109662 | A1 * | 5/2006 | Reiff | F21V 25/12 362/373 |
| 2008/0304254 | A1 * | 12/2008 | Canino | F21V 21/30 362/372 |
| 2012/0176767 | A1 | 7/2012 | Whitfield et al. | |
| 2012/0287613 | A1 | 11/2012 | Hamel et al. | |
| 2013/0128565 | A1 | 5/2013 | Cugini et al. | |
| 2016/0341407 | A1 | 11/2016 | Manfred | |
| 2017/0075194 | A1 | 3/2017 | Kim | |
| 2017/0261163 | A1 * | 9/2017 | Brennenstuhl | F21V 21/26 |
| 2019/0003699 | A1 | 1/2019 | Mondora | |
| 2019/0360671 | A1 | 11/2019 | Gall et al. | |
| 2019/0368702 | A1 * | 12/2019 | Sousa | F21V 21/15 |
| 2020/0003402 | A1 | 1/2020 | Kestler | |

FOREIGN PATENT DOCUMENTS

| | | | | |
|---|---|---|---|---|
| CN | 201561272 U | 8/2010 | | |
| CN | 202484811 U | 10/2012 | | |
| CN | 103277676 A | 9/2013 | | |
| CN | 203202888 U | 9/2013 | | |
| CN | 203286292 U | 11/2013 | | |
| CN | 203442650 U | * | 2/2014 | |
| CN | 203836621 U | 9/2014 | | |
| CN | 204026191 U | 12/2014 | | |
| CN | 204268331 U | 4/2015 | | |
| CN | 204300725 U | 4/2015 | | |
| CN | 105351888 A | 2/2016 | | |
| CN | 106895341 A | 6/2017 | | |
| CN | 107448796 A | * | 12/2017 | |
| CN | 107835650 A | 3/2018 | | |
| CN | 207162365 | * | 3/2018 | |
| CN | 108533989 A | * | 9/2018 | |
| CN | 208901139 U | 5/2019 | | |
| CN | 209325497 | * | 8/2019 | |
| CN | 110296338 A | 10/2019 | | |
| CN | 209540815 U | 10/2019 | | |
| CN | 210345376 U | 4/2020 | | |
| CN | 210511136 U | 5/2020 | | |
| CN | 210831725 U | 6/2020 | | |
| DE | 202011100750 U1 | * | 8/2011 | F21S 41/143 |
| DE | 202017104651 U1 | 8/2017 | | |
| JP | 2018037238 A | * | 3/2018 | F21L 4/02 |
| KR | 200364515 Y1 | 10/2004 | | |
| KR | 20170067484 A | * | 6/2017 | |
| KR | 2020180003523 U | 12/2018 | | |
| WO | WO-2018086047 A1 | * | 5/2018 | |
| WO | 2018120175 A1 | 7/2018 | | |

OTHER PUBLICATIONS

Shop Tool Reviews, "First Touch—Milwaukee 2126 M12 UnderBody Light Review [1200 Lumens]," <https://www.youtube.com/watch?v=J-yrcco8GP4> YouTube video dated Dec. 13, 2021.

International Search Report and Written Opinion for Application No. PCT/US2020/050328 dated Dec. 24, 2020 (10 pages).

Chinese Patent Office Action for Application No. 202080057964.3 dated Dec. 27, 2023 (14 pages including machine English translation).

Chinese Patent Office Action for Application No. 202080057964.3 dated Jul. 3, 2024 (19 pages including machine English translation).

* cited by examiner

UNDER CHASSIS LIGHT

CROSS-REFERENCE TO RELATED APPLICATIONS

This application is a national phase filing under 35 U.S.C. 371 of International Application No. PCT/US2020/050328 filed Sep. 11, 2020, which claims priority to U.S. Provisional Patent Application No. 62/939,392, filed on Nov. 22, 2019, U.S. Provisional Patent Application No. 62/901,907, filed on Sep. 18, 2019, and U.S. Provisional Patent Application No. 62/899,361, filed on Sep. 12, 2019, the entire contents of all of which are incorporated herein by reference.

FIELD OF THE INVENTION

The present invention relates to lights and, more particularly, to lights for use with a vehicle, such as on an underbody the vehicle.

SUMMARY

The invention provides, in one aspect, a light assembly configured to be removably coupled to a ferromagnetic support surface. The light assembly includes a base with a magnetic coupling member, a battery coupled to the base, an arm pivotally coupled to the base, and a light head pivotally coupled to the arm such that a position of the light head relative to the base is adjustable. The light head includes a light-emitting element powered by the battery. The magnetic coupling member is configured to support the light assembly by magnetic attraction to the support surface.

The invention provides, in another aspect, a light assembly configured to be removably coupled to a ferromagnetic support surface. The light assembly includes a base having a coupling member, a battery coupled to the base, an arm extending from the base, and a light head coupled to the arm. The arm is movable such that a position of the light head relative to the base is adjustable, and the light head includes a light-emitting element powered by the battery. The base includes a handle portion configured to be grasped to disengage the coupling member from the support surface.

The invention provides, in another aspect, a light assembly configured to be removably coupled to a support surface. The light assembly includes a base including a coupling member configured to removably couple the base to the support surface, an arm extending from the base, and a light head coupled to an end of the arm opposite the base. The arm is movable relative to the base such that a position of the light head relative to the base is adjustable. The light head includes a light-emitting element and a control interface for controlling operation of the light-emitting element. The magnetic coupling member is configured to support the light assembly by magnetic attraction to the support surface.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
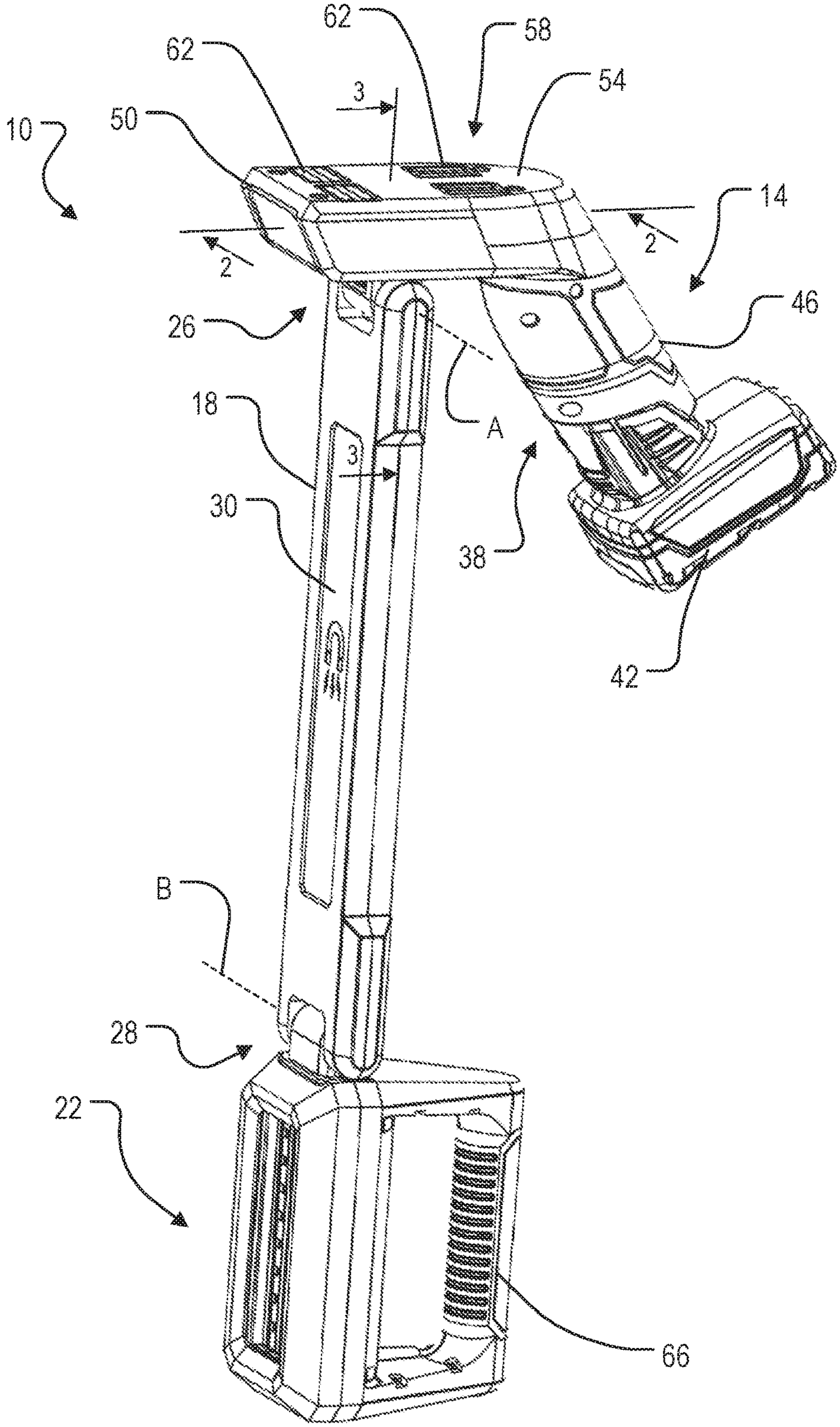
FIG. 1 is a perspective view of a light assembly according to an embodiment of the invention.

FIG. 1 illustrates a light assembly 10 according to an embodiment of the present disclosure. The light assembly 10 is configured to be removably coupled to a chassis of a vehicle and as such may be referred to as an under chassis light or an undercarriage light. The light assembly 10 may also be used in other locations and for other applications. For example, the light assembly 10 may be removably coupleable to any ferromagnetic surface, such as the underside of a vehicle hood for illuminating the engine bay, the side of a vehicle lift for illuminating the underside of the vehicle, the underside of a work table for illuminating an area of the work table, etc.

The illustrated light assembly 10 includes a base 14 and an elongated arm 18 extending from the base 14 to a light head 22. Opposite ends of the arm 18 are coupled to respective first and second pivot joints 26, 28. More specifically, the first pivot joint 26 couples the arm 18 to the base 14, and the second pivot joint 28 couples the arm 18 to the light head 22. In the illustrated embodiment, the first pivot joint 26 allows the arm 18 to pivot relative to the base 14 about a first axis A, and the second pivot joint 28 allows the light head 22 to pivot relative to the arm 18 about a second axis B. In the illustrated embodiment, the second axis B is parallel to the first axis A. In other embodiments, the axes A, B, may be angled or skewed relative to each other. Each of the pivot joints 26, 28 provides a single degree of rotational freedom, allowing the light head 22 to be adjusted to a variety of positions and orientations relative to the base 14. In other embodiments, one or both of the pivot joints 26, 28 may provide multiple degrees of rotational freedom. For example, one or both of the pivot joints 26, 28 may be configured as a two-axis pivot joint, able to permit relative rotation about two orthogonal axes. In yet other embodiments, one or both of the pivot joints 26, 28 may include a ball joint.

Figure 2:
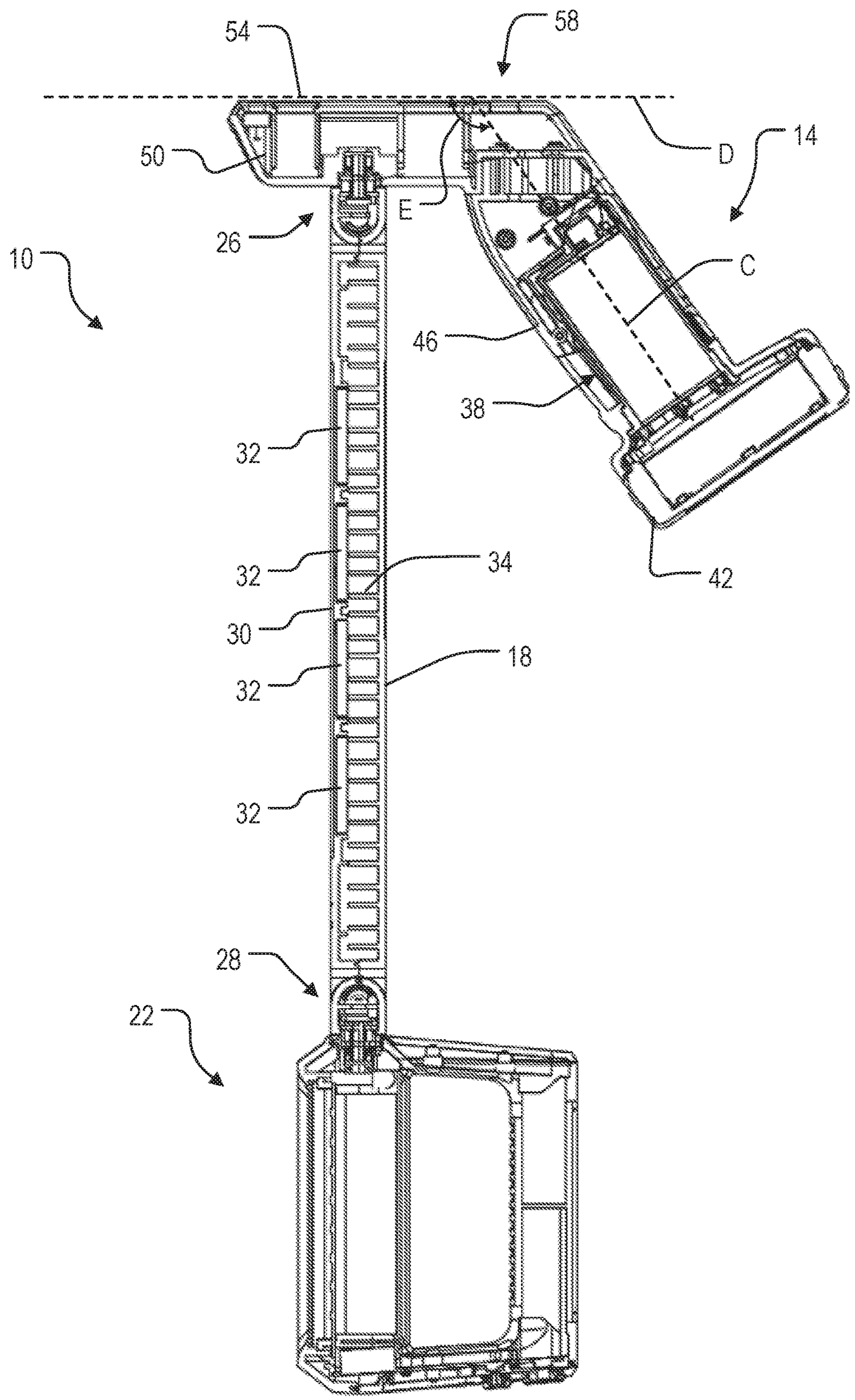
FIG. 2 is a cross-sectional view of the light assembly of FIG. 1, taken along line 2-2 in FIG. 1.
Figure 3:
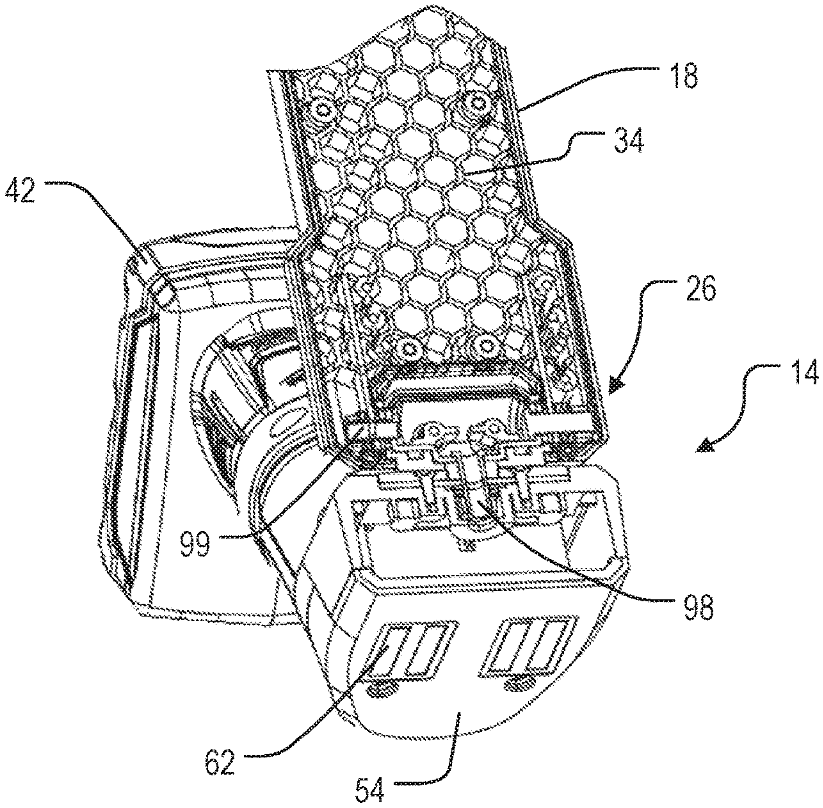
FIG. 3 is a partial cross-sectional view of the light assembly of FIG. 1, taken along line 3-3 in FIG. 1.

The illustrated arm 18 is an elongated member extending between the base 14 and the light head 22. The arm 18 is also rigid such that a distance between the base 14 and the light head 22 is fixed. In the illustrated embodiment, the arm 18 includes a recessed tray 30. One or more permanent magnets 32 (FIG. 2) is embedded in the arm 18 adjacent the tray 30. As such, the magnets 32 are able to attract ferromagnetic objects (e.g., bits, bolts, washers, and the like) to the surface of the tray 30. The tray 30 may thus allow a user to conveniently hold ferromagnetic objects and to inhibit such objects from falling out of the tray 30. In the illustrated embodiment, the recessed tray 30 with the permanent magnets 32 is only formed on one side of the arm 18. In other embodiments, the arm 18 may include trays with magnets on both sides of the arm 18. In the illustrated embodiment, the arm 18 includes an internal honeycomb structure 34 made up of a plurality of hexagonal cells (FIGS. 2 and 3). The honeycomb structure 34 reduces the weight of the arm 18 compared to a solidly constructed arm, while maintaining strength and rigidity.

Referring to FIGS. 1-2, the base 14 includes a battery receptacle 38 that receives a battery 42. More specifically, the illustrated base 14 includes a handle portion 46 and an attachment portion 50. The battery receptacle 38 is formed in the handle portion 46, and the handle portion 46 extends from the attachment portion 50 at an oblique angle. The battery 42 may be, for example, a power tool battery pack (e.g., a 12 volt battery pack, an 18 volt battery pack, etc.). As such, the battery 42 may also be removable from the battery receptacle 38 and replaceable or rechargeable. In other embodiments, the base 14 may include a dedicated battery. The attachment portion 50 includes a flat surface 54 and a magnetic coupling member 58 recessed into the flat surface 54 (FIG. 1). The magnetic coupling member 58 in the illustrated embodiment includes one or more permanent magnets 62. The permanent magnets 62 are of sufficient strength such that the magnetic coupling member 58 is able to support the entire weight of the light assembly 10. As such, the light assembly 10 can be removably coupled to a ferromagnetic surface via the magnetic coupling member 58.

With reference to FIG. 2, the handle portion 46 defines a longitudinal axis C that extends centrally along a length of the handle portion 46. In the illustrated embodiment, the battery 42 is at least partially insertable into and removable from the battery receptacle 38 along the axis C.

The attachment portion 50 includes a flat surface 54 defining a plane D. Both the arm 18 and the battery receptacle 38 extend from a side of the attachment portion 50 opposite the flat surface 54. The longitudinal axis C of the handle portion 46 and the plane D define an oblique included angle E, which in the illustrated embodiment, is greater than 90 degrees. In particular, the angle E may be between 95 degrees and 135 degrees. In some embodiments, the angle E may be between 100 degrees and 130 degrees. In additional embodiments, the angle E may be between 110 degrees and 125 degrees.

Figure 4:
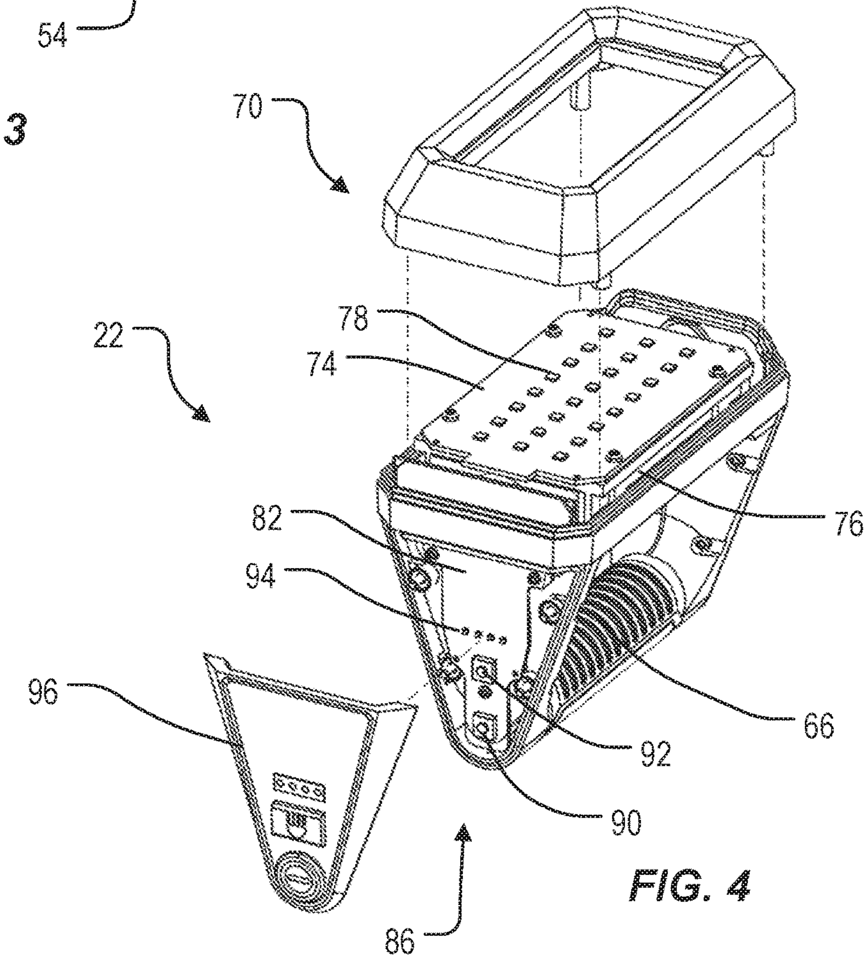
FIG. 4 is an exploded perspective view of a light head of the light assembly of FIG. 1.

Referring to FIG. 4, the light head 22 has a handle 66 for steering the light head 22. The illustrated handle 66 is a D-shaped handle defining a grip and an opening to receive a user's hand. As such, the handle 66 is configured to be easily grasped and manipulated by a gloved hand. In other embodiments, the light head 22 may include other suitable handles or gripping surfaces. The light head 22 also has a housing 70 that encloses a first PCB 74 mounted on a heat sink 76. The first PCB 74 includes a light-emitting element or light source. In the illustrated embodiment, the light source is an array of LEDs 78. In other embodiments, other suitable light sources may also or alternatively be mounted in the housing 70. The LEDs 78 are arranged to emit light from the light head 22 in a direction opposite the handle 66. In other words, the handle 66 extends from a side of the light head 22 opposite the light source.

The housing 70 also encloses a second PCB 82 including a control interface 86. The illustrated control interface 86 includes a first control 90 (e.g., a button) for turning the LEDs 78 on/off, a second control 92 (e.g., a button) for changing the mode (e.g., flood, spot, strobe) and/or brightness (e.g., low, medium high) of the LEDs 78, and an indicator 94 which, in the illustrated embodiment, is configured as a fuel gauge for the battery 42. A cover panel 96 covers the controls 90, 92 and indicator 94 while still providing access to the controls 90, 92 and indicator 94. The control interface 86 may include one or more microprocessors and memory containing firmware and/or software used to process inputs from the controls 90, 92 and control operation of the LEDs 78.

In the illustrated embodiment, wires (not shown) carrying power from the battery 42 are routed through the interior of the arm 18 and into the light head 22 for connection to the control interface 86. For example, with reference to FIG. 3, the first pivot joint 26 includes a first tubular passage 98 extending from the base 14 into the pivot joint 26, and a second tubular passage 99 extending from the pivot joint 26 into the arm 18. The wires are routed from the base 14 and into the arm 18 through the passages 98, 99. Similar passages (not shown) are included in the second pivot joint 28 for providing wiring access between the arm 18 and the interior of the housing 70.

In use, a user may couple the light assembly 10 to the chassis of a vehicle (or any other desired ferromagnetic surface) by positioning the flat surface 54 of the base 14 adjacent the ferromagnetic surface. The magnetic coupling member 58 magnetically attracts the base 14 to the surface with sufficient strength to support the weight of the light assembly 10. The user can then grasp the handle 66 on the light head 22 and adjust the position and orientation of the light head 22 as desired. The user may turn the LEDs 78 on/off using the first control 90 and adjust the mode and/or brightness of the LEDs 78 using the second control 92 to provide a desired illumination. The controls 90, 92 are advantageously positioned near the handle 66 such that the user may manipulate the controls 90, 92 (e.g., with the user's thumb) while simultaneously grasping the handle 66.

To decouple the light assembly 10 from the ferromagnetic surface, the user grasps the handle portion 46 of the base and applies force in a direction generally toward the surface. The angle E allows the user to easily grasp the handle portion 46 and provides sufficient leverage for the user to overcome the magnetic coupling force produced by the magnetic coupling member 58 and disengage the base 14 from the ferromagnetic surface.

Figure 5:
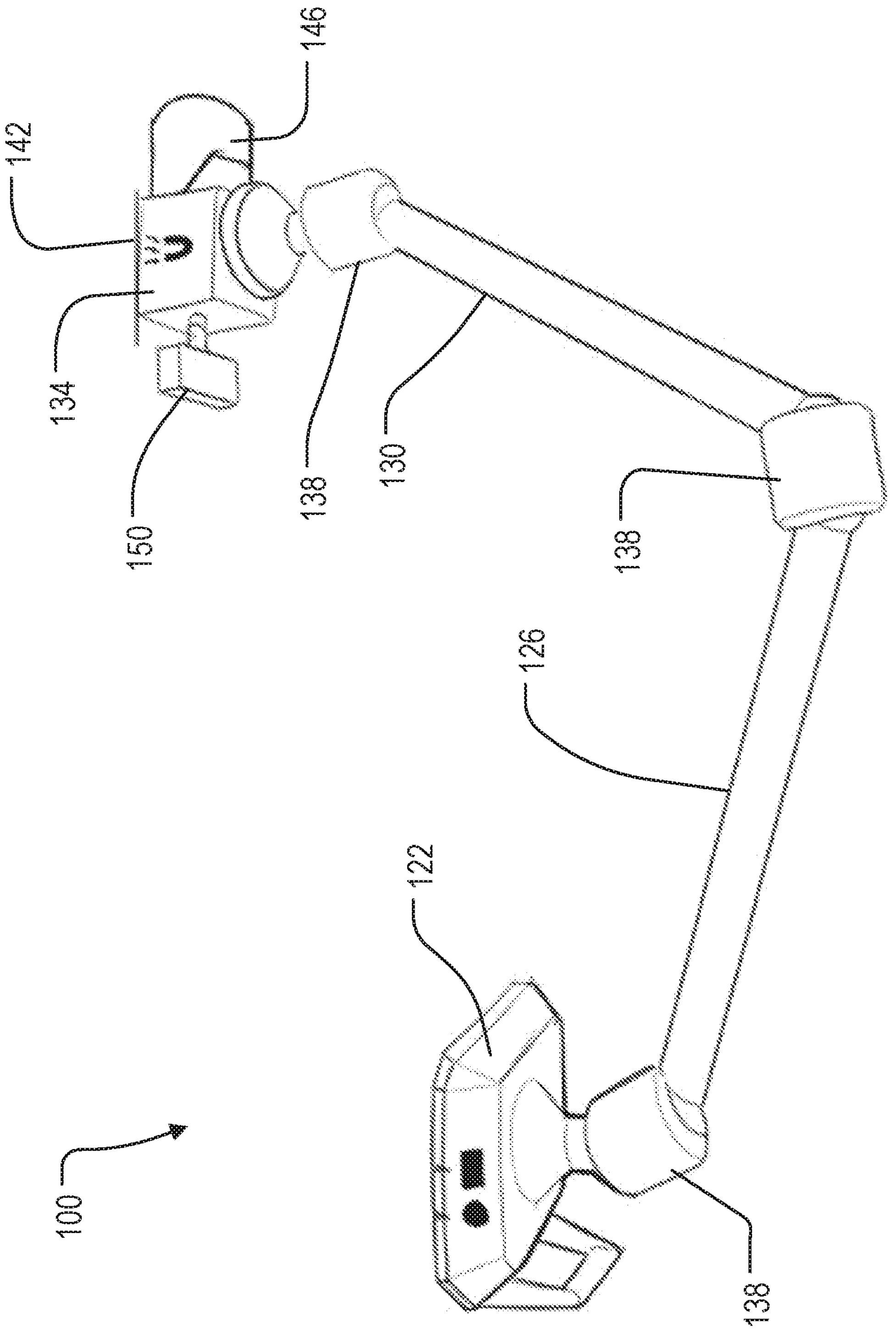
FIG. 5 is a perspective view a light assembly according to another embodiment of the invention.

FIG. 5 illustrates a light assembly 100 according to another embodiment and that may also be removably coupled to, for example, a chassis of a vehicle. The light assembly 100 is similar in some aspects to the light assembly 10 described above with reference to FIGS. 1-4, and the following description focuses primarily upon differences between the light assembly 100 and the light assembly 10.

Referring to FIG. 5, the light assembly 100 includes a light head 122, a first extension pole 126, a second extension pole 130, and a base 134. The light head 122 is coupled to a first end of the first extension pole 126 via a pivot joint 138, which, in the illustrated embodiment, is a ball joint. A second end of the first extension pole 126 is coupled to a first end of the second extension pole 130 via a second ball joint 138. A second end of the second extension pole 130 is coupled to the base 134 via a third ball joint 138. Each of the ball joints 138 allows rotation such that the light head 122 may be positioned in a multitude of positions relative to the base 134.

The base 134 includes a magnet 142, a battery 146, and a switch 150. The magnet 142 is removably couplable to the chassis or other ferromagnetic surface via actuation of the switch 150. That is, the magnet 142 may be an electromagnet selectively powered by the battery 146. The battery 146 also supplies power to the light head 122 via wires (not shown) run through the ball joints 138 and the extension tubes 126, 130. In other embodiments, the magnet 142 may be a permanent magnet. In such embodiments, the switch 150 may be omitted, or the switch 150 may be configured as a mechanical actuator (e.g., a lever) to facilitate moving the magnet 142 out of engagement with the ferromagnetic surface.

Figure 6:
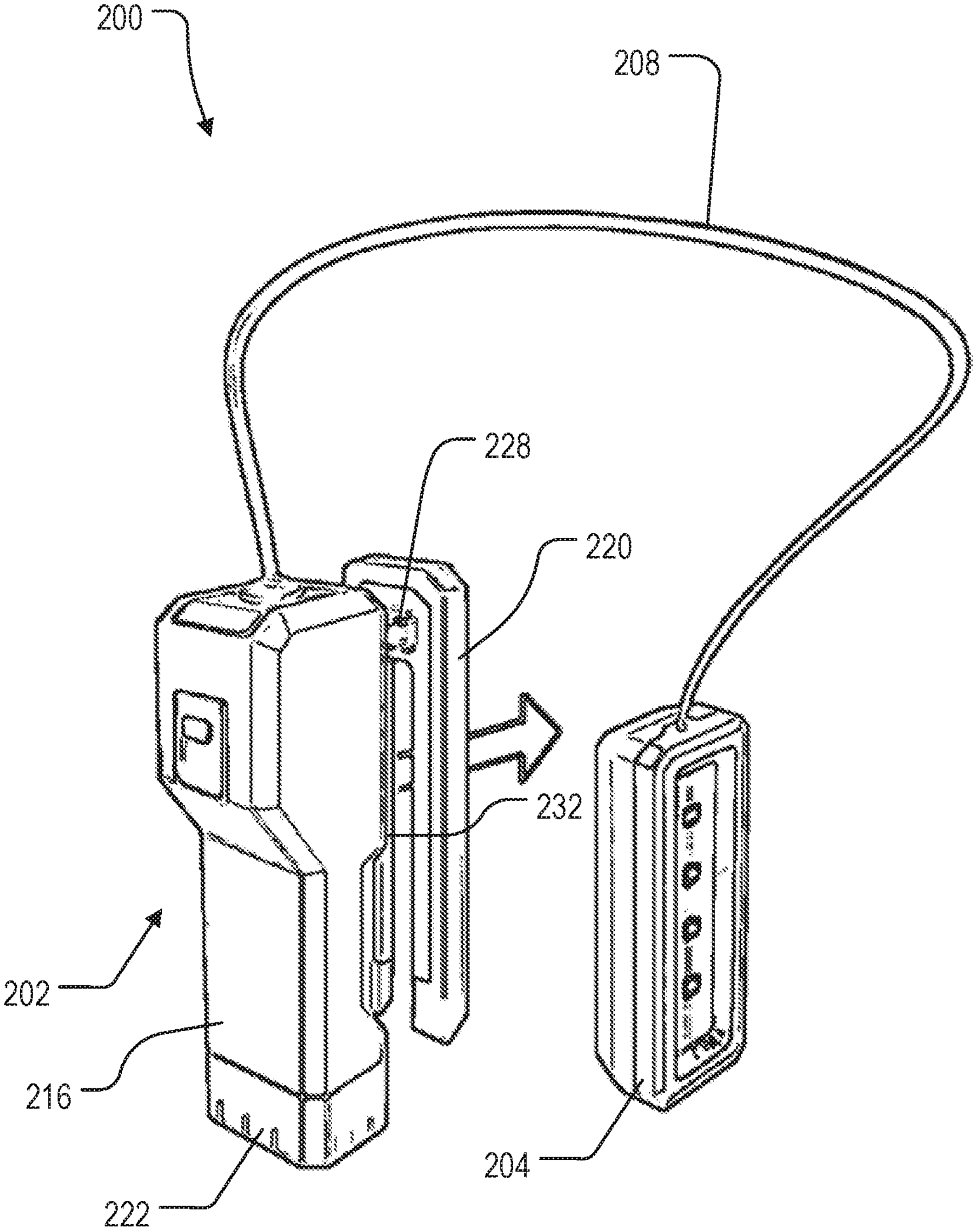
FIG. 6 is a perspective view of a light assembly according to another embodiment of the invention.

FIG. 6 illustrates a light assembly 200 according to another embodiment. The light assembly 200 is similar in some aspects to the light assembly 10 described above with reference to FIGS. 1-4, and the following description focuses primarily upon differences between the light assembly 200 and the light assembly 10.

Referring to FIG. 6, the light assembly 200 includes a base 202, a light head 204, and a flexible connection cord 208. A first end of the connection cord 208 is coupled to the light head 204, and a second end of the connection cord 208 is coupled to the base 202. In other words, the connection cord 208 couples the light head 204 to the base 202. The connection cord 208 is preferably stiff enough to support the weight of the light head 204. That is, the connection cord 208 may be bent into a desired form to adjust the light head 204 to a particular position and orientation. After bending, the connection cord 208 maintains its shape, such that the light head 204 remains in its current position and orientation.

The base 202 includes a housing 216 an internal battery (not shown), a clamp 220, and a magnet 222. The battery is configured to supply power to the light head 204 through the flexible connection cord 208.

The clamp 220 is coupled to the housing 216 via an actuation member 228. The clamp 220 extends substantially parallel to an opposing surface 232 of the housing 216. In the illustrated embodiment, the clamp 220 is U-shaped. In other embodiments, the clamp 220 may have other shapes.

The magnet 222 is disposed at a bottom end of the housing 216, opposite the connection between the housing 216 and the cord 208. The magnet 222 may be a permanent magnet or an electromagnet of sufficient strength to support the weight of the light assembly 200 when coupled to a ferromagnetic surface.

In use, the base 202 may be placed at a location proximate an intended illumination location. The base 202 may be secured in a desired position via the magnet 222. Alternatively, if a suitable ferromagnetic surface is not available, the base 202 may be clamped to a support using the clamp 220. Specifically, the support may be inserted between the clamp 220 and the housing 216, and the actuation member 228 retracted to clamp the support between the clamp 220 and the surface 232 of the housing 216. In some embodiments, the clamp 220 may be sized and shaped to clamp on to the hood of a vehicle. Once the base 202 is secured in a desired position, the light head 204 may be adjusted to a particular position and/or orientation by bending the connection cord 208.

Thus, the present disclosure provides, among other things, a light assembly for a chassis that may be positioned in a plurality of locations to allow light to be shown on hard to reach parts of the chassis. The present disclosure also provides, among other things, a light assembly that may be coupled to a surface via a magnet or a clamp. The light assembly may be positioned in a plurality of locations to allow light to be shown on hard to reach areas of a car, such as an engine compartment.

Various features of the invention are set forth in the following claims.

What is claimed is:

1. A light assembly configured to be removably coupled to a ferromagnetic support surface, the light assembly comprising:

a base including a magnetic coupling member;

a battery coupled to the base;

an arm pivotally coupled to the base; and a light head pivotally coupled to the arm such that a position of the light head relative to the base is adjustable, the light head including a light-emitting element powered by the battery, wherein the magnetic coupling member is configured to support the light assembly by magnetic attraction to the support surface;

wherein the base includes an attachment portion having a flat surface engageable with the support surface when the light assembly is coupled to the support surface; and wherein the base includes a handle portion extending from the attachment portion, the handle portion defining a longitudinal axis oriented at an oblique angle relative to the flat surface.

2. The light assembly of claim 1, wherein the angle is between 95 degrees and 135 degrees.

3. The light assembly of claim 1, wherein the handle portion includes a battery receptacle, and wherein the battery is at least partially inserted into the battery receptacle to couple the battery to the base.

4. The light assembly of claim 1, wherein the arm includes a tray and a permanent magnet enclosed within the arm adjacent the tray.

5. The light assembly of claim 1, wherein the light-emitting element is electrically connected to the battery through the arm.

6. The light assembly of claim 1, further comprising a control interface for controlling operation of the light emitting element, wherein the control interface is located on the light head.

7. The light assembly of claim 1, wherein the light-emitting element includes a plurality of LEDs.

8. The light assembly of claim 3, wherein the battery is removable from the battery receptacle along the longitudinal axis.

9. The light assembly of claim 6, wherein the control interface includes a first control configured to turn the light emitting element on/off, and a second control configured to adjust a brightness of the light emitting element.

10. The light assembly of claim 9, wherein the light head includes a handle configured to be grasped by a user to adjust the position of the light head relative to the base.

11. A light assembly configured to be removably coupled to a support surface, the light assembly comprising:

a base including a coupling member configured to removably couple the base to the support surface;

a battery coupled to the base;

an arm extending from the base; and a light head coupled to the arm, wherein the arm is movable such that a position of the light head relative to the base is adjustable, the light head including a light-emitting element powered by the battery, wherein the base includes a handle portion configured to be grasped to disengage the coupling member from the support surface;

wherein the base includes an attachment portion having a flat surface engageable with the support surface when the light assembly is coupled to the support surface;

wherein the handle portion extends along a longitudinal axis oriented at an oblique angle relative to the flat surface; and wherein the oblique angle is between 95 degrees and 135 degrees.

12. The light assembly of claim 11, wherein the coupling member includes a magnet configured to magnetically couple the base to the support surface.

13. The light assembly of claim 11, wherein the arm includes an internal honeycomb structure comprising a plurality of hexagonal cells.

14. The light assembly of claim 11, wherein the handle portion includes a battery receptacle that removably receives at least a portion of the battery.

15. The light assembly of claim 12, wherein the handle portion includes a battery receptacle, and wherein the battery is at least partially inserted into the battery receptacle to couple the battery to the base, and wherein the battery is removable from the battery receptacle along the longitudinal axis.

16. The light assembly of claim 13, wherein the arm is pivotally coupled to the base, and wherein the light head is pivotally coupled to the arm opposite the base.

17. A light assembly configured to be removably coupled to a ferromagnetic support surface, the light assembly comprising:

a base including a magnetic coupling member;

an arm extending from the base, the arm including a tray and a permanent magnet within the arm adjacent the tray; and a light head coupled to an end of the arm opposite the base, wherein the arm is movable relative to the base such that a position of the light head relative to the base is adjustable, the light head including a light-emitting element and a control interface for controlling operation of the light-emitting element, wherein the magnetic coupling member is configured to support the light assembly by magnetic attraction to the support surface;

wherein the base includes an attachment portion having a flat surface engageable with the support surface when the light assembly is coupled to the support surface; and wherein the base includes a handle portion extending from the attachment portion, the handle portion defining a longitudinal axis oriented at an oblique angle relative to the flat surface.

18. The light assembly of claim 17, further comprising a battery coupled to the base, wherein the light-emitting element is powered by the battery.

19. The light assembly of claim 17, wherein the tray is a recessed tray.

20. The light assembly of claim 14, wherein the battery extends out of the handle when coupled to the battery receptacle.

* * * * *